Sept. 3, 1946.    N. H. YOUNG, JR    2,406,880
INTELLIGENCE TRANSMISSION SYSTEM
Filed Aug. 29, 1942    6 Sheets-Sheet 1
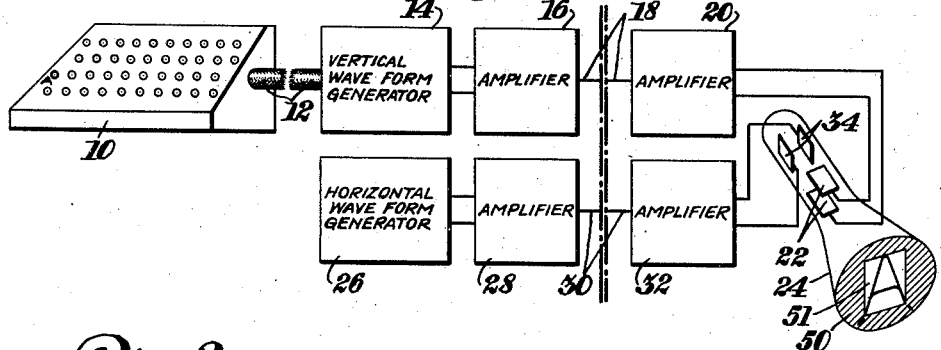
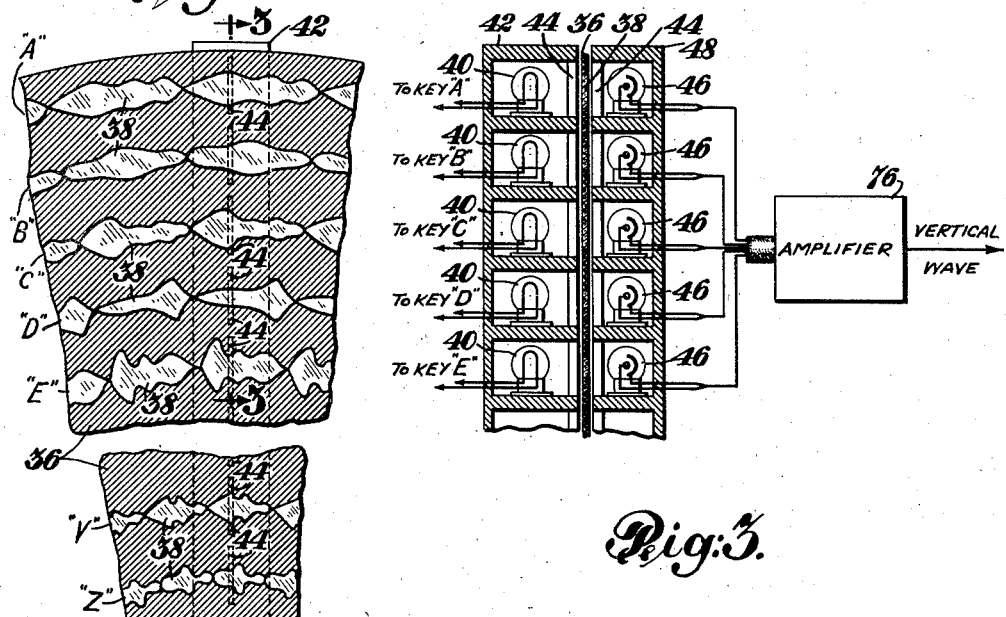
INVENTOR
NORMAN H. YOUNG, JR.
BY
ATTORNEY

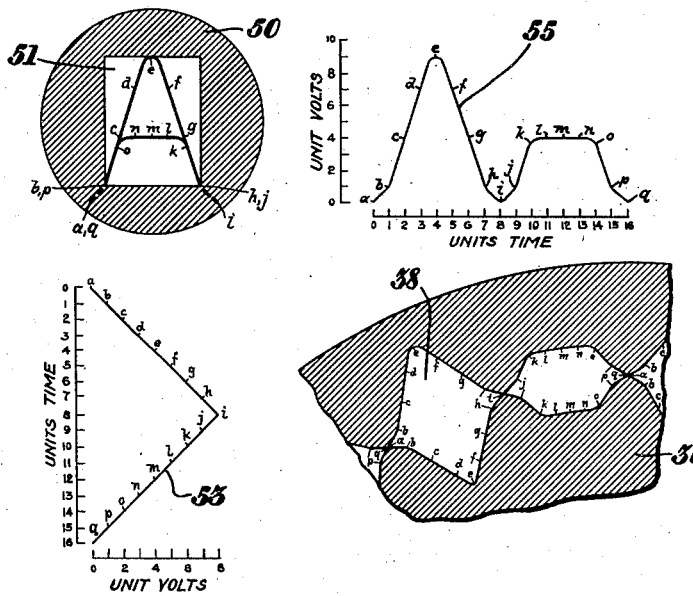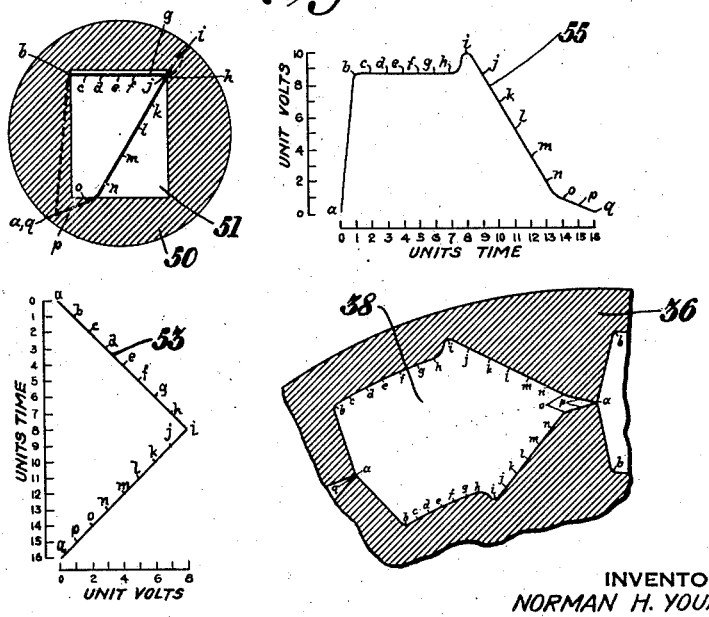

Sept. 3, 1946.     N. H. YOUNG, JR     2,406,880
INTELLIGENCE TRANSMISSION SYSTEM
Filed Aug. 29, 1942     6 Sheets—Sheet 3
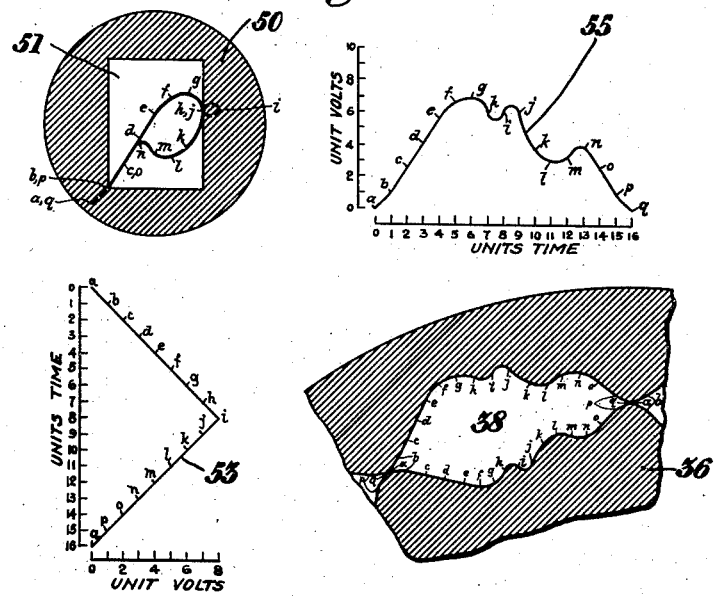
Fig: 4c
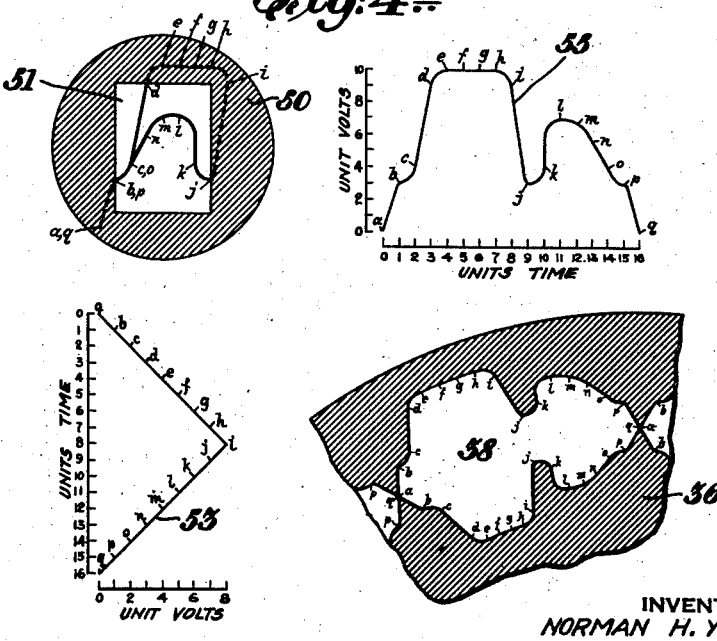
Fig: 4d
INVENTOR
NORMAN H. YOUNG, Jr.
BY
ATTORNEY Sept. 3, 1946.　　　　N. H. YOUNG, JR　　　　2,406,880
INTELLIGENCE TRANSMISSION SYSTEM
Filed Aug. 29, 1942　　　　6 Sheets-Sheet 4
Fig. 5.
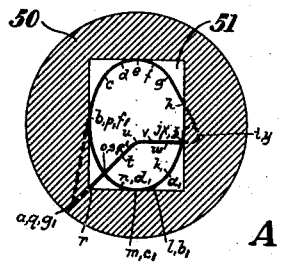
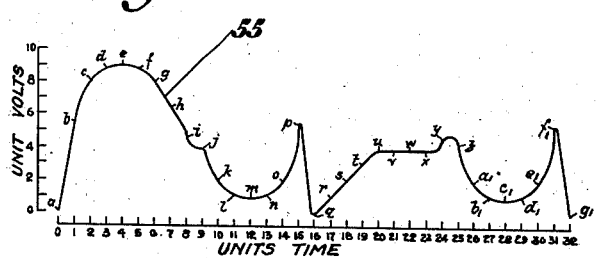
A
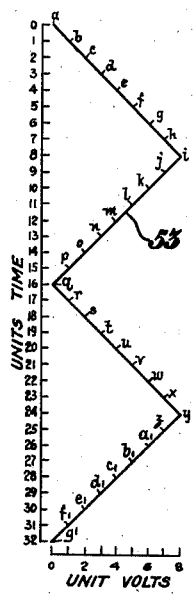
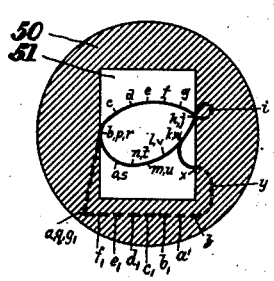
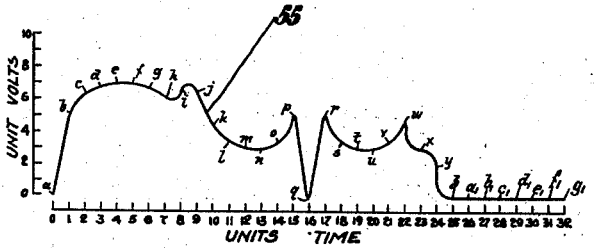
B
INVENTOR
NORMAN H. YOUNG, JR.
BY
ATTORNEY Sept. 3, 1946.   N. H. YOUNG, JR   2,406,880
INTELLIGENCE TRANSMISSION SYSTEM
Filed Aug. 29, 1942   6 Sheets-Sheet 5
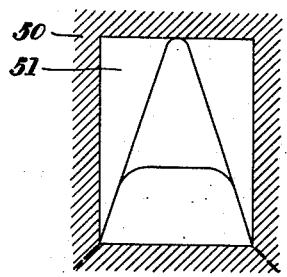
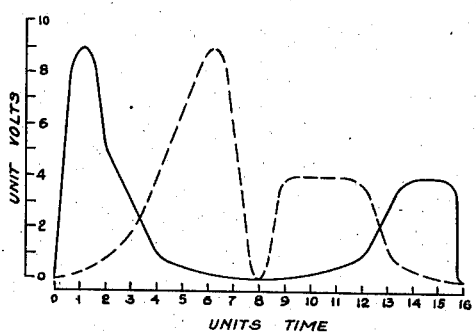
Fig. 6.
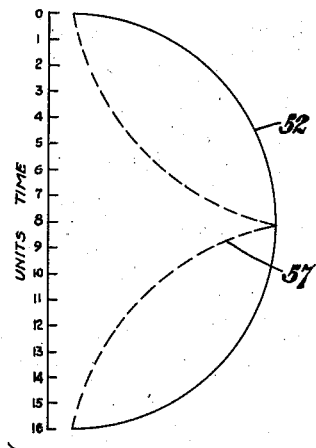
Fig. 11.
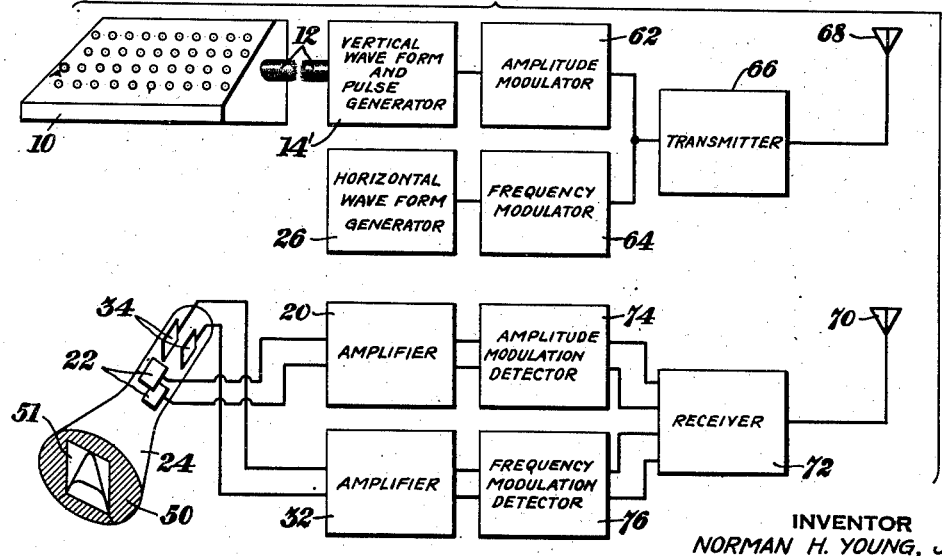
INVENTOR
NORMAN H. YOUNG, JR.
BY
ATTORNEY Sept. 3, 1946.  N. H. YOUNG, JR  2,406,880
INTELLIGENCE TRANSMISSION SYSTEM
Filed Aug. 29, 1942  6 Sheets-Sheet 6

INVENTOR
NORMAN H. YOUNG, JR.
BY
ATTORNEY

Patented Sept. 3, 1946

2,406,880

UNITED STATES PATENT OFFICE 2,406,880

INTELLIGENCE TRANSMISSION SYSTEM

Norman H. Young, Jr., Jackson Heights, N. Y., assignor to Federal Telephone and Radio Corporation, a corporation of Delaware Application August 29, 1942, Serial No. 456,651

19 Claims. (Cl. 178—18)

This invention relates to intelligence transmission systems and more particularly to systems for transmitting and receiving intelligence in the form of a sequence of individual characters, such as letters of the alphabet, numerals, and the like.

An object of this invention is to provide a method and means for transmitting intelligence over conductors or through spaces, which permits the use of a plurality of relatively simple receiving and reproducing apparatuses.

Another object of this invention is to provide an improved intelligence transmission system in which a predetermined wave-form corresponding to a selected character is transmitted and converted at the receiver to a corresponding legible character.

Still another object of this invention is to provide an improved method and means for breaking up selected characters into vertical and horizontal wave-forms, and reconverting such waveforms into corresponding legible characters.

A further object of this invention is to provide a method and means for breaking up selected characters into two wave-forms, one of which is the same for all characters and the other of which varies with the individual character to be transmitted, and reconverting said wave-forms into legible characters at a receiving station.

An additional object of this invention is to provide an improved secret intelligence transmission system.

A more specific object of this invention is to provide a method and means for breaking up selected characters into horizontal and vertical waveforms, one waveform being common to all characters and the other varying with each individual character, transmitting the variable waveform, and combining this variable waveform with the common waveform at a receiver for conversion into corresponding legible characters.

Other objects and advantages of the present invention will appear from a study of the following description of a preferred embodiment and modifications thereof, taken in connection with the attached drawings, in which:

Fig. 1 is a block circuit diagram illustrating a preferred embodiment of the present invention;

Fig. 2 is a fragmentary front elevation of a scanning disk forming part of the present invention;

Fig. 3 is a vertical cross-sectional view taken along the line 3—3 of Fig. 2 illustrating the relationship of the scanning disk with other parts of a waveform generator;

Figs. 4a, 4b, 4c and 4d show examples of letters and their corresponding scanning disk apertures to be used with the present invention;

Fig. 5 illustrates further examples of letters and scanning disk apertures;

Fig. 6 is a further example of a letter made with modified horizontal waveforms;

Fig. 11 is a block circuit diagram illustrating principles of the present invention as applied to wireless transmission.

Figure 7:
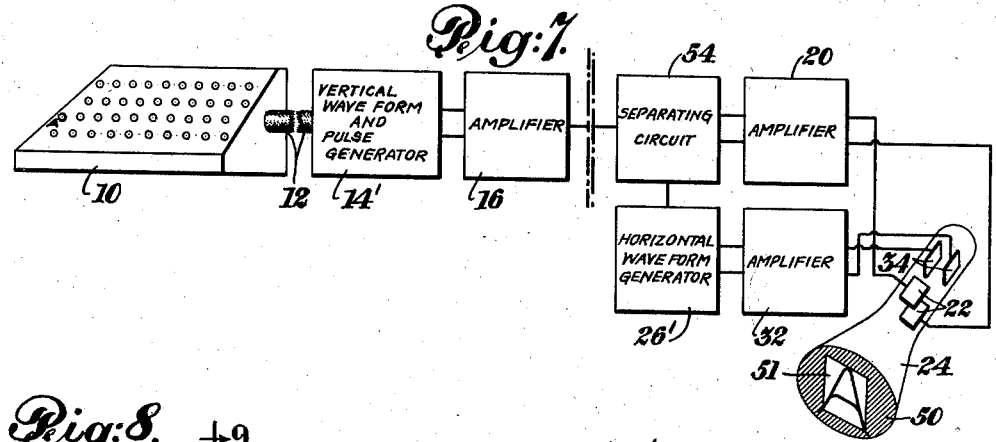
Fig. 7 is a block diagram illustrating a still further modification of the transmission system of the present invention.

The relatively simple block circuit diagram illustrated in Fig. 1 shows the basic principles of the present invention. As there illustrated, a keyboard 10, provided with a plurality of keys each corresponding to a character which it is desired to transmit, is connected by suitable means, such as a multiple cable 12, to a vertical wave form generator 14, to be described in more detail hereinafter. The generator 14 is shown as preferably connected through an amplifier 16 to a transmission line 18. A suitable receiving station will include an amplifier 20 connected to the transmission line 18, the amplifier 20 being in turn connected to the vertically spaced electrodes 22 of a cathode ray tube 24, of the usual type provided with a fluorescent screen. The transmitting station also includes a horizontal wave form generator 26 connected through an amplifier 28 to transmission line 30, while the receiving station, in turn, will also include an amplifier 32 connected to the transmission line 30 and supplying voltage to the horizontal electrodes 34 of the cathode ray tube 24.

In the preferred embodiment of the invention just described above, it is contemplated that the vertical wave form generator 14 is designed to generate individual vertical waves depending upon the character to be transmitted, the generator 14 being controlled for this purpose by the depressing of a suitable key (A) of the keyboard 10. The horizontal wave form generator 26, on the other hand, is designed to produce one type of wave which will be used for all of the characters. At the receiving station the combination of the chosen vertical wave with the common horizontal wave will produce the desired character on the fluorescent screen of the cathode ray tube 24. In the form of invention now contemplated it is preferred that the horizontal wave form generator produce a triangular wave, and means for producing such a shaped wave are well known to the art; the details of such a triangular wave form generator need therefore not be discussed. The vertical wave form produced by the generator 14, which wave form differs for each character to be transmitted, may be produced in the novel manner described below.

In accordance with a preferred arrangement illustrated in Figs. 2 and 3, the vertical wave form corresponding to each character to be transmitted is produced by means such as a disk 36 having a plurality of radially spaced annular apertures 38, each of these apertures having a special predetermined cross-section. As indicated in Fig. 3, this disk is adapted to rotate between sources of light 40 and light-sensitive devices 46, there being preferably provided one light source and one light-sensitive device for use in connection with each aperture. It will be obvious to those skilled in this art that if a light source is energized, excitation of the corresponding light-sensitive device will depend upon the cross-section of the interposed aperture, and as the disk 36 containing the aperture rotates between the energized light source and the light-sensitive device, the excitation of the light-sensitive device will vary in accordance with a predetermined pattern, corresponding to the cross-section of the aperture, resulting in a voltage wave which is transmitted to the amplifier 16, and thence to the receiver, as shown in Fig. 1. The energization of the various light sources 40 may be controlled by the keyboard 10 in such a manner, for example, that when the key "A" is depressed the upper lamp 40 in Fig. 3 will be energized and the light-sensitive device 46 will, in turn, be then excited in accordance with the pattern of the aperture 38 on the disk 36, which has previously been predetermined for the letter "A." Of course, during this time the remaining lamps will not be energized and, as is well known in the manual keyboard art, means may be provided on the keyboard for preventing depression of more than one key at a time; in this manner one is assured that only one lamp will be energized and the pattern for one letter only transmitted at any particular moment. In the structural arrangement illustrated in Fig. 3 the lamps 40 are shown as mounted in individual compartments in a suitable housing 42, such housing being substantially open along its side adjacent the disk 36. The light passing through the apertures 38 is transmitted through narrow slits 44 to the light-sensitive devices 46 which may be mounted in a suitable supporting structure 48. In order to prevent false excitation of the light-sensitive devices due to undesired spreading of the light, it is presupposed that the disk 36 be mounted as closely as possible next to the slits 44.

The disk 36 containing the patterns of the light transmitting apertures may be formed in any suitable manner. Because such apertures have an extremely variable cross-section it is proposed, for the sake of simplicity, that the apertures be photographed on the disk, it being understood that the apertures themselves will be transparent while the rest of the disk will be opaque. Since the apertures need have a maximum height of not more than three-eighths of an inch, it is possible to place a suitable series of radially spaced apertures to correspond to the entire alphabet on a relatively small disk. In order that the vertical waves produced by the disk 30 may be properly synchronized with the horizontal wave-form produced by the generator 26, it will, of course, be necessary that the apertures corresponding to the beginning of each character start and end along common radii, the difference in scanning speed between the outer part of the disk and the inner part of the disk being properly compensated by the size of the aperture. The number of repetitions of the vertical wave for each revolution of the disk is unimportant, it being only important that there be a whole number of apertures for each revolution.

It will be obvious to those skilled in this art that the basic principle of the present invention, namely the reproduction of characters by means of vertical and horizontal waves can be effected by means other than those just described which, in both the mechanical and electrical sense, are to be considered as equivalents. For example, the waveforming aperture 38 may be produced upon the periphery of a drum as well as upon the face of a disk and, likewise, can be produced upon a continuous tape for each letter. The excitation of the individual light-sensitive devices under the control of the keyboard 10 can be accomplished either by the energization or deenergization of the individual light sources 40 or, on the other hand, by proper construction, a single large light source could be used, the passage of light to the individual photo-electric cells in such a case being controlled by shutters operated either mechanically or electrically by the individual character keys or by a direct switching of the individual photo-electric cell circuits. It is further to be understood that in connection with the physical form of invention illustrated in Figs. 2 and 3, such has been given merely by way of example.

The manner in which the individual letters are built up on the screen of the cathode ray tube 24 from the transmitted horizontal and vertical wave is more clearly illustrated by the examples shown in Figs. 4a, 4b, 4c, 4d and 5. In accordance with the present invention the cathode ray screen is preferably provided with a shield 50 having an aperture 51 of predetermined dimensions corresponding to the size of the character to be formed but, in any event, smaller than the surface of the screen itself. In Fig. 4a there is shown, by way of example, the manner in which the letter "A" is formed from a single triangular wave 53 in combination with a vertical wave 55 of predetermined shape. The cathode ray tube is normally biased so that the light spot will be positioned at a point $a$ which is behind the shield 50. By following the coordinates of the horizontal wave 53 in combination with the coordinates of the vertical wave 55, it will be seen that a tracing of the letter "A" begins at this point $a$. The point $b$ will then appear at the lower left-hand side of the aperture 51 after passage of the first time unit. As the two waves progress in synchronism the tracing on the fluorescent screen will then follow the points $c, d, e, f, g$ until the point $h$ has been reached. The light spot will then momentarily pass behind the screen to the point $i$, returning in the next time unit to the point $j$ which is coincident with the point $h$. From thence the lower part of the letter will be retraced on the return portion of the triangular wave through the points $k$, $l$, $m$, $n$, $o$ and $p$ to the starting point $q$, coincident with the point $a$.

While in the tracing of the letter "A," the shield is not necessary to mask the light beam except for starting purposes, such masking is necessary for certain characters, as will be more apparent from a study of further examples of traced letters. Of course, in tracing a letter such as "A" the sequence of the tracing operation is unimportant, as one might trace the lower part of the letter before the upper part, as well as in the manner first indicated. A change in the sequence of the tracing will, of course, require a slightly different vertical wave. The corresponding aperture 38 in the disk 36 which, in effect, is an envelope of the wave 55 has also been illustrated in connection with the letter "A."

The system is equally capable of producing numerals as shown in the example of the tracing of the numeral "7" in Fig. 4b. In the tracing of the numeral "7" the use of the mask on the cathode ray screen in order to provide suitable starting and return points is clearly indicated. Fig. 4b also illustrates the scanning disk aperture necessary to produce the required vertical wave. Examples of lower case letters which may be traced by the apparatus of the present invention are illustrated in Figs. 4c and 4d. In Fig. 4c an example of a lower case letter having a depending tail is shown in the tracing of the letter "p." The corresponding vertical wave and disk aperture are also given.

Fig. 4d shows an example of a lower case letter with a vertical extending portion, such as the letter "h." This figure also shows the corresponding vertical wave and required disk aperture. In connection with the numeral "7" and the lower case letters "p" and "h," it is again pointed out that the sequence of tracing indicated on the diagrams need not be followed, since in any case the reverse order of tracing can be used and additional variations may be used as may be apparent to those skilled in this art. If any changes are made, however, corresponding changes in the shape of the vertical wave and in the aperture producing that wave will have to be made.

Many characters can be properly traced using one triangular wave for the same unit time as the corresponding vertical wave. Some examples of these have been illustrated in Figs. 4a, 4b, 4c and 4d. Other more complicated characters, however, will require two complete triangular waves for each corresponding vertical wave. Examples of such characters have been illustrated in Fig. 5. In general, it may be stated that the upper case letters, numerals and lower case letters can be grouped in accordance with the following table:

double triangular wave 53' in connection with the predetermined vertical wave, it will be noted that the first half of the double horizontal wave in connection with the proper vertical wave may be used to trace all of the letter with the exception of the horizontal bar. Since in an ordinary formed "G" the horizontal bar does not extend all the way across the left side of the letter and, on the other hand, the trace must return to its starting point in accordance with the shape of the horizontal wave, the tracing of the horizontal bar will involve a return tail between the points $r$ and $u$ as appears in the showing of the letter. However, despite this tail the letter will be entirely legible and recognizable so that this characteristic which only occurs in very few of the characters does not negative the usefulness of the system as a whole. The letter "G" has been specifically shown as the worst example of a letter which may be traced by the form of invention now under discussion. Fig. 5a also illustrates the form of aperture necessary to produce the required vertical wave. Fig. 5b illustrates the formation of a lower case "a" by the use of a double triangular wave in connection with a properly designed vertical wave-producing aperture.

It will be noted that in Fig. 1 a single horizontal wave form generator has been illustrated and described whereas applicant has pointed out that certain designated characters may be formed with a single triangular wave, whereas other characters need a double triangular wave. It does not follow, however, that two horizontal wave form generators are necessary since in all cases the double triangular wave can be used. With those letters which require only a single triangular wave and whose vertical wave forms are coordinated for a single horizontal wave, the use of a double horizontal wave will only result in a repetition of the letter.

One of the advantages of the system illustrated in Fig. 1 and which has just been described, lies in the fact that the keyboard need only control the vertical wave form generator, the horizontal wave form being common to all characters, with the result that the control of the apparatus by the keyboard 10 is relatively simple.

While a triangular horizontal wave has been illustrated by way of example, it will be apparent to those skilled in this art that, within limitation, the horizontal wave may have substantially any predetermined common form. In Fig. 6 I have illustrated in solid and dotted lines, respectively, the vertical waveform which would be used, for example, in making the letter "A" with either a semi-circular 52 or an inverse sine horizontal 57 waveform. The important limi-

*Number of triangular waves required for selected characters*

| Waves | |
|---|---|
| one | A C D F I L M N O P U V W X 1 7 c f h l m n o p v w x y |
| two | B E G H J K Q R S T Y Z 2 3 4 5 6 8 9 a b d e g i j k q r s t u z |

Turning to the types of letters which require two complete horizontal waves for each single vertical wave, Fig. 5 illustrates two examples, one of which is unusual and the other more or less typical. If a standard predetermined triangular horizontal wave is to be used, those letters which have horizontal components which do not extend entirely across the letter will be formed with a return tail as shown, for example, in the formation of the letter "G" in Fig. 5a. In tracing the formation of such a character from the tation with regard to the shape of the common horizontal wave is that it should not contain extremely abrupt changes as would be encountered, for example, in a rectangular wave except in those cases, such as a sawtooth wave, in which the abrupt changes is used as a flyback only. The ordinary sine wave, it is obvious, is entirely suitable. To take care of characters requiring a double horizontal wave, it is contemplated that the common horizontal waveform, no matter what shape is chosen, be repeated as explained above in connection with the triangular horizontal wave.

Figures 8, 9:
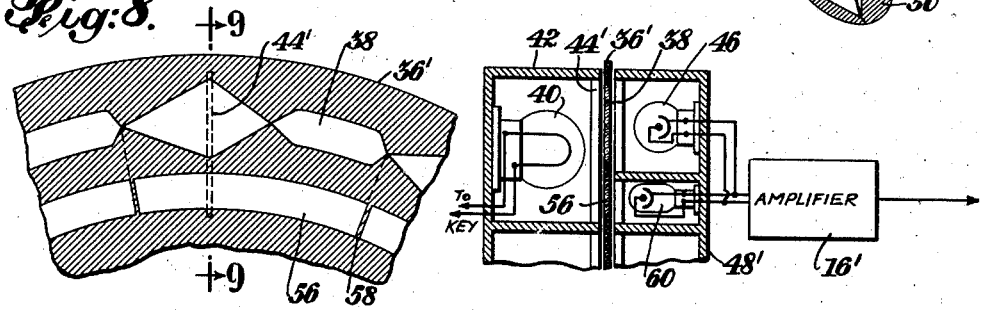
Fig. 8 is a partial front elevation of a scanning disk to be used in connection with the system shown in Fig. 7.
Fig. 9 is a partial vertical cross-sectional view of a wave form generator, taken along the line 9—9 of Fig. 8.

The form of invention illustrated in Fig. 1, the horizontal wave form which is common to all characters, readily lends itself to a single transmission line or radio channel system such as illustrated in Fig. 8. In such an arrangement the transmission station need consist only of the keyboard 10, a vertical waveform generator 14' and the necessary amplifier 16. The vertical waveform generator 14' can be of substantially the same construction as the generator 14 indicated in Fig. 1, but must also provide means for assuring proper synchronization of the local horizontal waveform generator 26' at the receiver. Synchronization of the horizontal waveform generator can be accomplished in several ways which will be recognized as substantial equivalents to those skilled in this art.

In a preferred form illustrated synchronization is effected by adding a suitable pulse of opposite value from the normally transmitted vertical wave, this pulse being separated from the vertical wave at the receiving station by a separating circuit of any well-known type indicated at 54, and the separate pulse being then transmitted to the horizontal waveform generator 26 for synchronizing purposes.

Figure 10:
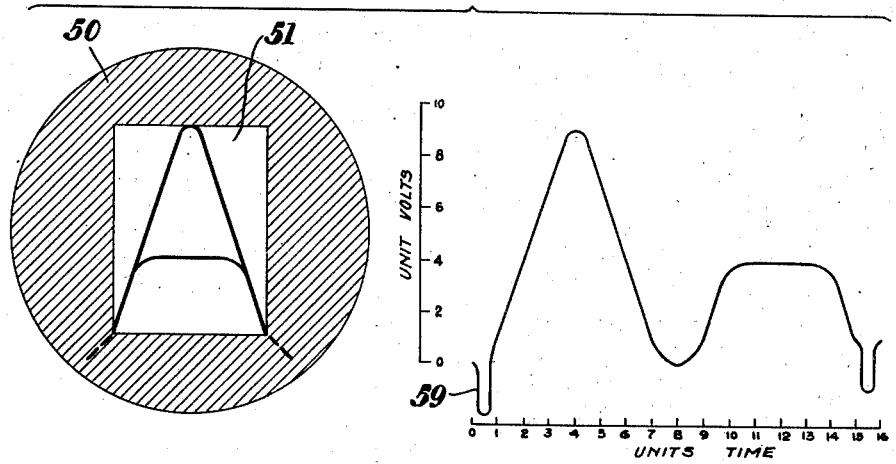
Fig. 10 shows a letter and vertical wave form diagram produced by the transmission system illustrated in Fig. 8.

One manner of producing the required negative pulse is illustrated in Figs. 9 and 10 in which the scanning disk 36' is provided not only with character-controlling apertures 38 but also with an additional aperture 56 interrupted during the first time unit of each character-aperture by an opaque section 58. An additional light-sensitive device 60 will be used to respond to the light-interruption at the beginning of each character-aperture, and since the light-sensitive device 60 responds in the opposite manner to the light-sensitive device 46, it will produce a pulse in the opposite direction to the wave produced by excitation of the light-sensitive device 46. In this case the slit 44' adjacent the scanning disk 36' will be extended to permit the entry of light to the additional light-sensitive device 60. The resultant vertical wave transmitted has been shown, by way of example, in connection with the letter "A" in Fig. 11. It will be noted in this connection that the negative pulse 59 will occur during the time unit both for the vertical and the horizontal wave when the light beam on the screen of the cathode ray tube will be behind the shield 50 so that any change of the horizontal beam during this period will not adversely affect the formation of the character desired. The resulting vertical wave impressed upon the electrodes 22, however, will not differ from that of the system illustrated in Fig. 1, since the negative pulse will have been removed from this wave by the separating circuits 54. If, however, the separating circuit is of such a character that the negative pulse is not entirely removed, this will be unimportant as the resultant change in the vertical wave imposed upon the tube will occur behind the screen 50. Methods of controlling the synchronization of the horizontal waveform generator by means of the separated pulse are well known in the art and a description of the circuits involved is accordingly believed to be unnecessary.

The additional light sensitive device 60 may be used to give a synchronizing pulse common to all of the characters. However, it will be obvious that the necessary variation in light flux to produce a synchronizing pulse may be included in the pattern for each character, in which case no additional light sensitive device is required, but the pattern for such character will take up slightly more room.

Any other suitable method of obtaining a synchronizing pulse can be used. For example, the vertical waveform generator may be provided with suitable means for obtaining a synchronizing tone frequency which will then be separated at the receiver and used to trigger the horizontal waveform generator. Instead of exciting the light-sensitive devices 46 and 60 in the opposite sense as has been proposed in Figs. 9 and 10, they may be excited in the same sense and then shifted in phase before the two waves are transmitted together over the connected line. One manner of causing such phase shift would be to use separate amplifiers of different numbers of stages. For example, four stages for the vertical waveform and three stages for the pulse, whereby the pulse would be 180° out of phase with the vertical waveform. Still another way of transmitting the vertical waveform and the synchronizing pulse over the same channel would be to modulate the amplitude of the vertical wave and modulate the frequency of the pulse whereby at the receiving end an amplitude modulation receiver would be used to supply power through a suitable amplifier through the vertical electrodes of the cathode ray tube and a frequency modulation detector would be connected so as to control the horizontal waveform generator.

The transmission systems previously described have all been proposed for use in connection with the transmission of intelligence over interconnecting transmission lines. It will be clear to those skilled in this art, however, that all forms of the system are equally applicable to the transmission of such intelligence by radiation in free space. One form which such a system may take has been illustrated, by way of example in Fig. 11, in which the keyboard 10 controls the vertical waveform generator 14, the output of which is modulated in amplitude by suitable well-known means indicated at 62, impressed upon the transmitter 66 and radiated from the antenna 68. The horizontal waveform generator 26 of the type producing the same double triangular waves for all characters may be frequency modulated by a suitable means indicated at 64 and likewise connected to the transmitter 66 and radiated in synchronism with the amplitude modulated vertical waves. The signals picked up by the antenna 70 and the receiver 72 will be separated into the vertical and horizontal waveform components by the respective detectors 74 and 76 amplified by suitable amplifiers 20 and 32' respectively and impressed upon the proper electrodes of the cathode ray tube 24. Where a local horizontal waveform generator is used as in the system illustrated in Fig. 8, the frequency modulation waves transmitted may be used to control the synchronization of the local horizontal waveform generator. It will, therefore, be at once apparent to those skilled in this art that the system in accordance with this invention can be adapted for wireless transmission in all cases. Where a local horizontal waveform generator is used, a synchronizing pulse may be imposed upon the radiated vertical waveform as in the system illustrated in Fig. 7, as well as using separate amplitude and frequency modulation as shown in Fig. 11.

It is clear that the novel transmission system according to the present invention is especially adaptable to the transmission of secret intelligence. In the forms of inventions wherein only one waveform is transmitted, either over a line or through space, interceptions of this one waveform would be unintelligible unless the interceptor knew the waveform of the other component. Accordingly, by the use of a local horizontal waveform generator at the receiver, the generated local waveform being maintained secret, secrecy of the entire system can be preserved. By correlating a series of vertical waveform generators with corresponding local horizontal waveform generators, changing the two from time to time in accordance with a pre-arranged code, will still further increase the possibilities of secrecy.

It is to be understood that in all forms of the invention the horizontal waveform generator may be used to provide the main controlling pattern instead of using the vertical waveform generator for this purpose, as has been described in the examples given. Likewise, in all cases involving amplitude modulation of the vertical waveform generator and frequency modulation of the horizontal waveform generator or pulse, the reverse operation, namely frequency modulation of the vertical waveform generator and amplitude modulation of the horizontal waveform generator or pulse is equally applicable.

It is also contemplated that instead of using a single disk or cylinder to form the vertical waveform pattern, as previously described, separate disks carrying a single character pattern may be used for each character or a group of characters. Additionally, instead of using a system having a rotating disk with a light-interrupted pattern in combination with a light-sensitive device on the transmitting end, I may employ a system of electronic scanning of a perforated target or a target having variable emissivity. Such scanning may be single line scanning instead of multi-line scanning. The shape of the perforations in a perforated target or of the high emissive portions in the case of a target having a variable emissivity will not correspond to the shape of the characters but are of the shape of the waveform to be used for vertical deflections.

It will be noted that in all cases I propose to make use of a receiver having a cathode ray tube in which the beam is kept at constant intensity and its movement is controlled in accordance with the transmitted signal. This is exactly opposite to the method usually followed in the ordinary facsimile system, since usually the path of the beam is independent of the transmitted signal and the luminosity is controlled by such transmitted signal.

It will be obvious to those skilled in this art that photographic means may well be used for recording the letters reproduced on the cathode ray tube screen, and it is accordingly contemplated that this invention can be equally well used in direct reading or recording systems.

Attention is directed to the fact that the intelligence transmission system of the present invention is capable of producing intelligible characters with a relatively small frequency spectrum, thus enabling either higher speed transmission or the use of lower grade channels. Additionally, the receiver and transmitter have been simplified as compared with standard electronic scanning systems.

Having described a preferred embodiment of my invention together with certain modifications thereof, what I claim is as follows:

1. An intelligence transmission system comprising, in combination, means for producing a first predetermined wave form corresponding to one parameter of a character to be transmitted, means for producing a second predetermined waveform corresponding to another parameter and common to all of the characters to be transmitted, and means for combining said waveforms into a legible character.

2. The combination according to claim 1, in which the fundamental frequency of said second waveform is an integral multiple of that of said first waveform.

3. The combination according to claim 1, in which said last means comprises a cathode ray tube having a fluorescent screen and a pair of horizontal and a pair of vertical electrodes, in combination with means for connecting one waveform to one pair of electrodes and the other waveform to the other pair of electrodes.

4. The combination according to claim 1, in which said last means includes a cathode ray tube having a fluorescent screen, a mask covering said screen, said mask being provided with a centrally disposed opening adapted to frame the character formed, and means for connecting one waveform to one pair of electrodes and the other waveform to the other pair of electrodes.

5. A method of conveying intelligence which includes the steps of decomposing each character to be conveyed into one waveform peculiar to each character and a second wave form common to all characters, transmitting the one characteristic wave form of the desired character, and combining the transmitted waveform with the common waveform into a legible desired character.

6. In an intelligence transmission system, a transmitter including a series of patterns, each pattern corresponding to one parameter of a character to be transmitted, means for generating a waveform in accordance with a chosen pattern, means for generating a second waveform in synchronism with said first waveform and corresponding to a second parameter common to all of the characters to be transmitted, and a receiver including means for receiving said waveforms and means for simultaneously converting and combining said waveforms into a legible character.

7. The combination according to claim 6, in which the fundamental frequency of said second waveform is an integral multiple of that of said first waveform.

8. The combination according to claim 6, in which said last means comprises a cathode ray tube having a fluorescent screen, and a pair of horizontal and a pair of vertical electrodes, in combination with means for connecting one received wave to one pair of electrodes and the other received wave to the other pair of electrodes.

9. The method of transmitting intelligence, which includes the steps of decomposing each character to be transmitted into one waveform peculiar to each character and a second waveform common to all characters, transmitting the one characteristic waveform of the desired character, simultaneously and synchronously transmitting the common waveform, and combining the transmitted wave forms into a legible character at a receiver.

10. The combination according to claim 6, in combination with separate channels for carrying said waveforms from said transmitter to said receiver.

11. The method according to claim 9, which includes the step of transmitting the separate waveforms over individual channels.

12. In an intelligence transmission system, a transmitter including a series of patterns, each pattern corresponding to one parameter of a character to be transmitted, means for generating a waveform in accordance with a chosen pattern, and means for generating a synchronizing pulse, and a receiver including means responsive to said synchronizing pulse for generating a second waveform in synchronism with said one waveform and corresponding to a second parameter common to all of the characters to be transmitted, and means for simultaneously converting and combining said waveforms into a legible character.

13. The combination according to claim 12 in which said synchronizing pulse is impressed upon and in an opposite direction to the one waveform at the beginning thereof, and in which said receiver includes means for separating said synchronizing pulse from said one waveform.

14. The combination according to claim 12, in which the fundamental frequency of said second waveform is an integral multiple of that of said first waveform.

15. The combination according to claim 12, in which said last means comprises a cathode ray tube having a fluorescent screen, and a pair of horizontal and a pair of vertical electrodes, in combination with means for connecting one waveform to one pair of electrodes and the other waveform to the other pair of electrodes.

16. The method of transmitting intelligence, which includes the steps of decomposing each character to be transmitted into one waveform peculiar to each character and a second waveform common to all characters, transmitting the one characteristic waveform of the desired character, receiving said characteristic waveform, generating the common waveform at the receiver, and then combining the received characteristic waveform with the common waveform into a legible character.

17. The method according to claim 16 which includes the further step of synchronizing the generation of the common waveform with the reception of the characteristic waveform.

18. The combination according to claim 6, in which said transmitter includes two separately distinguishable carrier modulating means, in combination with the means for connecting one waveform generator to one modulating means and the other waveform generator to the other modulating means, and means at said receiver for reconverting the received signals into the two transmitted waveforms.

19. The method according to claim 9, which includes the steps of transmitting both waveforms over a single channel by respectively different modulations of a carrier, and separating the modulating waveforms from the carrier at the receiver.

NORMAN H. YOUNG, Jr.